United States Patent [19]

Stewart

[11] 4,034,952
[45] July 12, 1977

[54] HOT PLASTIC INJECTION BUSHING

[75] Inventor: James M. Stewart, Greenville, S.C.

[73] Assignee: Kenics Corporation, North Andover, Mass.

[21] Appl. No.: 608,106

[22] Filed: Aug. 27, 1975

[51] Int. Cl.$^2$ .......................................... B29F 1/00
[52] U.S. Cl. ............................ 249/105; 425/143; 425/550; 425/572; 425/461
[58] Field of Search .......... 425/144, 243, 461, 247, 425/242 R, 143; 249/105, 222

[56] References Cited

U.S. PATENT DOCUMENTS

| 1,947,335 | 2/1934 | De Mattia | 425/233 X |
| 2,309,943 | 2/1943 | Ernst | 425/144 |
| 2,508,988 | 5/1950 | Bradley | 425/144 X |
| 3,194,868 | 7/1965 | Shaw | 425/144 X |
| 3,609,809 | 10/1971 | Slicker | 425/144 |
| 3,819,775 | 6/1974 | Mules | 425/144 |
| 3,819,777 | 6/1974 | Vermersburger | 425/144 X |

Primary Examiner—Robert L. Spicer, Jr.
Attorney, Agent, or Firm—Russell & Nields

[57] ABSTRACT

A hot plastic injection bushing for delivering molten plastic molding material from an injection molding machine to a cavity mold in which the bushing comprises a smooth bore tubular member, the bore of which is adapted to pass the molten plastic from the molding machine to one or more parts of the mold. The tubular member is heated by means of a heat pipe surrounding the tubular member. The heat pipe comprises an evacuated chamber partially filled with a vaporizable liquid and is heated by means of an external electrical heater automatically controlled to maintain the temperature of the heat pipe at a desired value. The heat pipe is provided with internal wicking along a localized portion and the heater is located adjacent the wicking. The heat pipe operates to maintain all parts of the tubular bore at the same temperature and the bushing maintains the plastic material in the bore in its molten state between successive molding injections except for a small plug in an output area.

9 Claims, 3 Drawing Figures

HOT PLASTIC INJECTION BUSHING

BACKGROUND OF THE INVENTION

In injection molding of thermoplastic materials, when such materials are fed from the injection nozzle of an injection molding machine into a cavity mold, the materials pass through a number of channels before finally flowing into the cavity in which the desired piece to be molded is formed. The molding material located in the channel leading from the injection machine into the mold is usually called a "sprue" while the materials in the channels within the mold itself are usually referred to as "runners". It is often desirable to prevent solidification of the sprue or the runners, or both, between successive injections in order to avoid waste of the sprue and runner material and otherwise to improve the speed and the quality of the operation of the system. For this purpose heated bushings have been used to contain the sprue and sometimes to contain the runners. Heaters have been located within the bushing bore and have been heated by electrical heating elements embedded within the heater. Examples of such sprue heaters are shown in U.S. Pat. Nos. 3,010,155 and 3,767,340. However, prior art devices suffer from several weaknesses. Due to the nature of the heater it is difficult to maintain a uniform temperature throughout the sprue. Hot spots and cool spots occur which produce nonuniform heating of the sprue material which results in a non-uniform melt being injected into the mold. Also the introduction of a heater into the sprue bore unduly increases the surfaces to which the molten material of the sprue may adhere and contaminate a suceeding injection. This is particularly objectionable in the case where the suceeding injection is of a different color from the proceeding injection. The presence of the heater within the sprue or runner channel also raises the pressure drop in the flow of the molten material and the resistance to such flow. Also such heaters involve an undesirable degree of maintainance, requiring frequent replacement of the heating element with consequent interruptions in the operation of the equipment.

SUMMARY OF THE INVENTION

The present invention reduces, and in many cases eliminates, the defects of the prior art by providing a heated bushing in which the bore through which the heated plastic flows is surrounded by a heat pipe. A heat pipe, as that term is used in this case, comprises a hollow evacuated body having conductive walls and containing a vaporizable liquid within a limited volume of the cavity within the body. Heat is applied to a localized portion of the liquid which draws heat from the heat source causing some of the liquid to vaporize. The resultant vapor fills the pipe and condenses on the cavity walls of the body thus releasing its latent heat of vaporization. Such a heat pipe possesses the remarkable property of maintaining the entire cavity wall area at the same uniform temperature which is determined by the vapor pressure existing within the cavity and by the latent heat vaporization of the liquid. In a preferred embodiment of the present invention, heat is applied by an external heater attached to a portion of a sprue bushing extending outside of the cavity mold.

DETAILED DESCRIPTION OF PREFERRED EMBODIMENT

Figure 1:
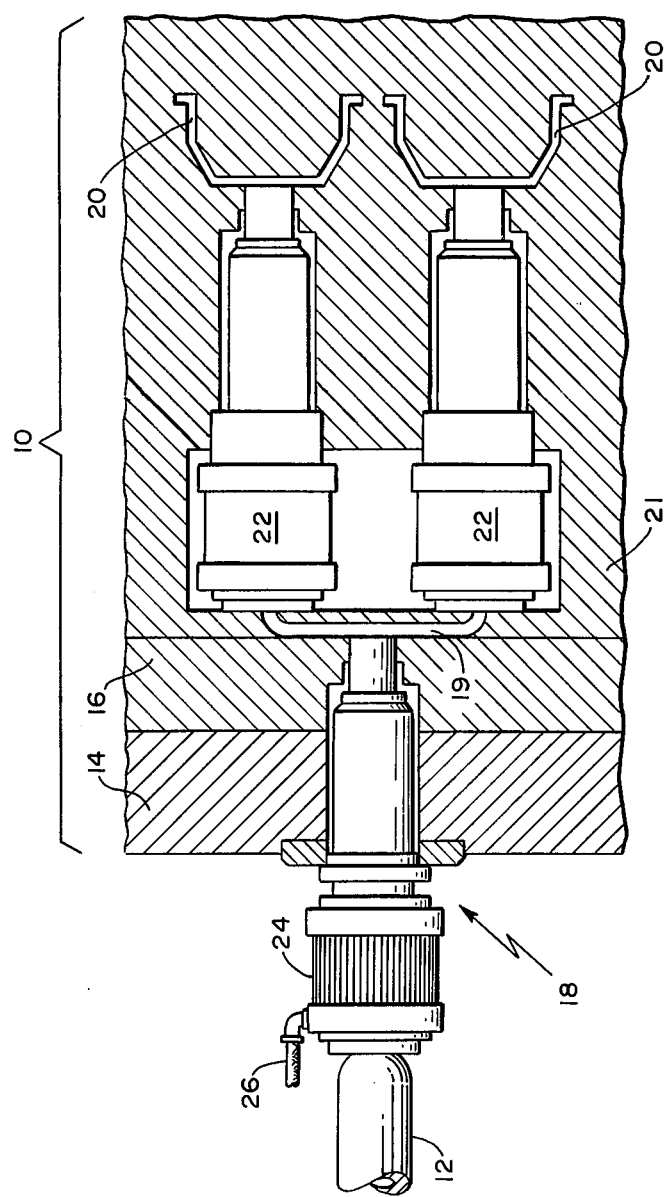
FIG. 1 is an elevational view of a hot sprue bushing interposed between the injection nozzle of an injection molding machine and a portion of a cavity mold, shown in cross section, said cavity mold also containing heated bushings containing some of the runner portions of the system.

FIG. 1 shows a cavity mold 10 into which molten heated plastic is injected from the injection nozzle 12 of an injection molding machine. Mold 10, shown primarily in diagrammatic form, comprises an outer wall constructure 14, 16, in which a hot sprue bushing 18, incorporating the present invention, is secured. Bushing 18 is interposed between the nozzle 12 and the mold 10. Mold 10 may be any desired type, such as one containing a runner 19 which conducts the molten plastic flowing from the bushing 18 into a plurality of cavities 20 in which the plastic solidifies to form the desired parts. The distribution of the molten plastic by the runner 19 occurs in a manifold section 21. In order to maintain the molten plastic in liquid form in the branches of the runner 19 which pass through the manifold into the cavities 20, each such branch may also be contained in a bushing 22, substantially similar to bushing 18. As will be described in greater detail in FIG. 2, bushing 18 is supplied with an electrical heater band 24 fed with heating current from a cable 26.

Figure 2:
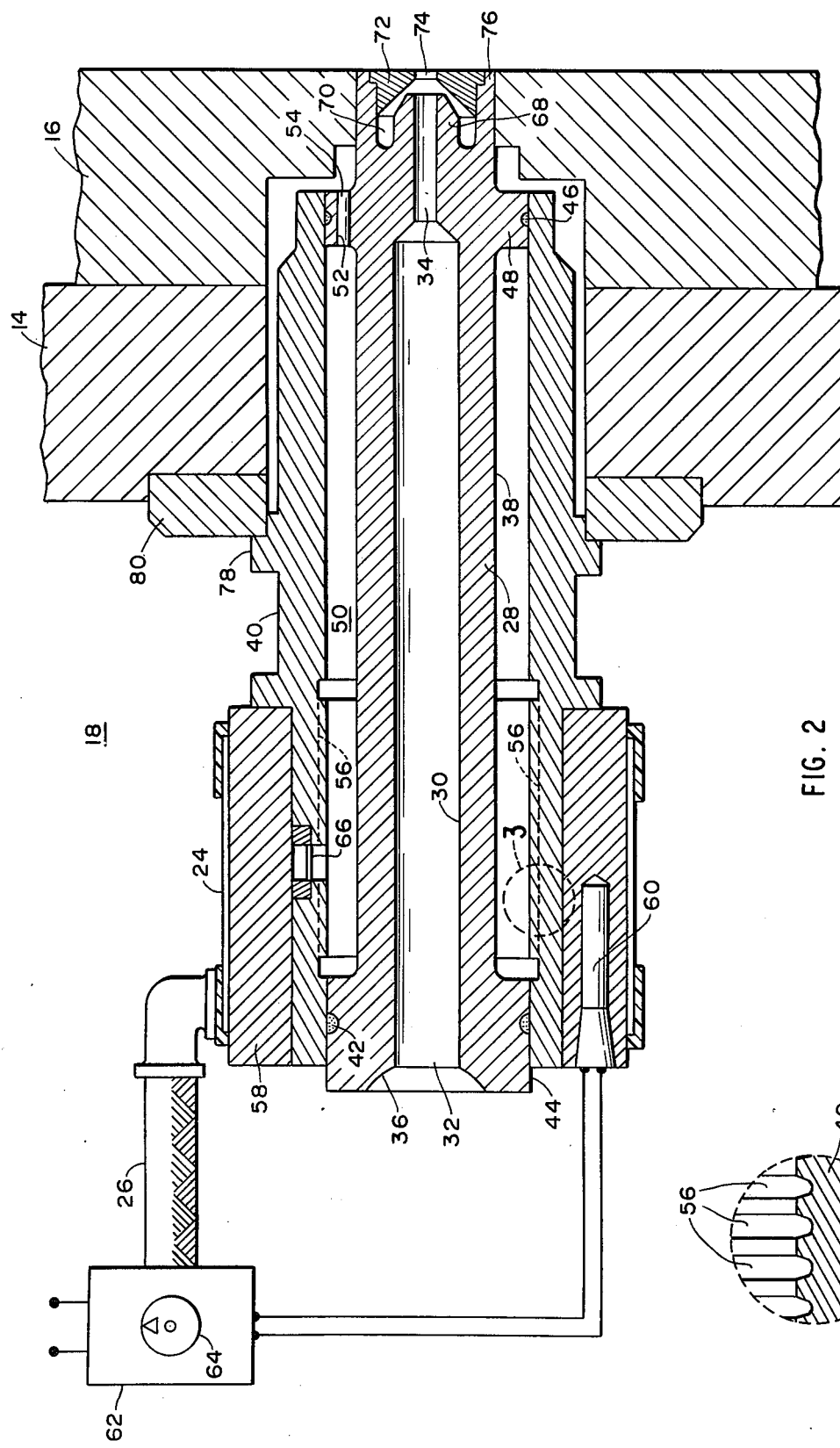
FIG. 2 is a cross section of the hot sprue bushing of FIG. 1, as mounted in a portion of the cavity mold, also shown in cross section.

As shown in FIG. 2, the bushing 18 comprises a central tube 28 having a smooth, uninterrupted bore 30, leading from an entrance port 32 to an output nozzle port 34. The entrance port 32 is provided with a spherical seat 36 adapted to receive the rounded end of the injection nozzle 12 shown in FIG. 1. It will be noted that bore 30 is completely clear of any obstructions such as heaters, torpedoes and valves used in prior art devices. As a result the present structure greatly reduces the tendency of the bushing to create and accumulate contaminating plastic portions which reduce the quality of the resultant product.

The use of such an uninterrupted passage for the flow of the molten plastic is made possible, at least in part, by the novel manner in which it is heated. The outer wall 38 of tube 28, which is made of heat conductive metal, comprises an inner wall of heat pipe. The outer wall of the heat pipe is formed by an outer casing 40. Casing 40 is brazed at one end, by brazing material 42, to a collar 44 at one end of tube 28 and by brazing material 46 to a collar 48 at the other end of tube 28, to form a vapor tight chamber 50 between tube 28 and casing 40. A hole 52 is drilled in collar 48 through which chamber may be partially filled with a suitable vaporizable liquid, such as water. In a typical case, about 30 % of the volume of chamber 50 is filled with the liquid. After the liquid has been introduced into chamber 50, air is evacuated from the chamber and the hole 52 is sealed with a plug 54.

Figure 3:
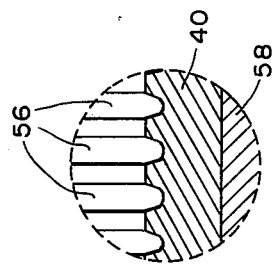
FIG. 3 is a greatly enlarged section of a portion of the wall of the heat pipe portion of the bushing, showing capillary grooves formed in such wall.

The inner surface of casing 40 adjacent the collar 44 is provided, along the portion indicated by the dotted lines 56, with wicking. The term "wicking" is used to designate any means which is wetted by the liquid in the chamber 50 and which, by capillary action, causes the liquid to travel throughout the wicking material. The details of the wicking employed in the present embodiment are illustrated in FIG. 3 which comprises a greatly enlarged section of the inner wall of casing 40 within the dotted circle 3 in FIG. 2. The wicking comprises capillary grooves 56 which extend around the entire inner surface of the casing 40 at the dotted lines 56. Due to capillary action, the entire inner circumference of casing 40 adjacent lines 56 is wetted by the liquid in chamber 50.

Immediately adjacent the surface of casing 40 which is wetted by capillary action, casing 40 is surrounded by a heat conducting collar 58 the outer surface of which is provided with heater band 24. If desired, collar 58 could be made integral with casing 40. Heater band is of any standard type electrical heater which is supplied with heating current through cable 26.

When heater band 24 is energized, it transfers heat through collar 58 to the wetted surface of casing 40 at 56-56. The heating of heater band 24 is regulated so as to raise the temperature at which it is desired to maintain the walls of the bore 30, in order to keep the plastic material within said bore in its molten state. This temperature is within the range at which the liquid in chamber 50 will vaporize readily and is below the liquid's critical temperature. Such vaporization extracts heat from the heated surfaces 56-56. The vapor thus generated fills the entire chamber 50 and recondenses on the internal surface of the chamber thus releasing its latent heat of vaporization to such surface. Thus the chamber 50 and its associated structure operates as a heat pipe. As previously described, such a heat pipe possesses the remarkable property of maintaining the entire wall area of the chamber 50 at the same uniform temperature as determined by the liquid and the vapor pressure to which the vapor of the liquid is raised by the heater band 24. Any changes in temperature are virtually instantaneously propagated throughout the heat pipe surfaces giving an extremely accurate control of the entire system. Due to the fact that the interior surfaces of bore 30 are directly connected to the surrounding heat pipe surfaces 38 through high-heat conductive metal, the surfaces of bore 30 are likewise maintained at the same predetermined temperature throughout, which provides the system with the advantages heretofore detailed.

Control of the temperature within the bore 30 can be made automatic by mounting a control thermocouple 60 at any convenient location, such as within the collar 58, and by feeding the output of termocouple 60 to an adjustable circuit controller 62 which automatically regulates the current supplies to cable 26 in accordance with the setting of an adjustment 64 on the circuit controller 62.

Perferrably, the heat pipe chamber 50 is supplied with a safety device comprising a rupture disk assembly 66 mounted in an opening casing 40. Therefore, should the pressure in chamber 50 tend to rise above a safe value, rupture disk assembly 66 will provide the requisite relief.

During operation, not only is the bore 30 maintained at the desired temperature but also such temperature is transmitted beyond the bore 30 to the exhaust nozzle port 34 which is located in an exhaust nozzle 68. Nozzle 68 is surrounded by a heat insulating space 70 which, during operation, fills with plastic which is also a good heat insulator. Thus nozzle 68 is also maintained at the desired temperature. The final exit from the bushing 18 is through a gate plug 72 provided with a opening port 74.

The injection nozzle 12 (FIG. 1) delivers a charge of molten plastic through bushing 18 to the runner 19 and cavities 20 and the plastic is permitted to solidify. Thereupon the mold 10 is opened and the solid runner and the solidified parts in the cavities 20 are removed. Thereupon the mold 10 is closed and is ready to receive the next charge. During the interval between charges, due to the characteristics of the bushing 18, as described, the only part of the plastic material in the bushing system which is permitted to solidify is the very small plug which remains in the port 74. This is sufficiently small so that it does not appreciabl effect the quality of the succeeding charge.

The bushing 18 is mounted in the wall 14-16 of the mold 10 by an outer sleeve 76 at the end of tube 28, said sleeve being closely fitted into an opening in the wall member 16 to provide good heat transfer from member 16 to tip 72. Also a locating rim 78 on casing 40 is fitted into a locating ring 80 set into the outer surface of the wall member 14 to provide mechanical support with minimum of heat transfer.

It is to be understood that the structure described in detail above represents a perferred embodiment of the invention and that various modifications of such structure may be made within the scope of the appended claims. For example, instead of the bushing 18 being provided with a single exhaust port 34, the bore 30 may terminate in a plurality of such exhaust ports which may thus operate as a manifold. In addition to the location of my novel bushing as shown in FIG. 1, such bushings may be used anywhere in a plastic molding structure where it is desired to maintain the material in molten condition. It is to be understood that the term'-'bushing" is used in a general sense and is intended to include all devices having the claimed structure whether they are called bushings, nozzles, conducts, or the like. Since there is virtually no temperature drop along the length of the heat pipe, the length of the bore in which the plastic material is kept molten may be of any desired value. Also such bore need not be straight but may have any configuration which may be desired to extend the heating effect of the heat pipe into locations heretofore virtually inaccessible in the prior art. It is further to be understood that the claimed structure is useful for both thermosetting plastics as well as thermoplastics and therefore the term "plastic" is intended to cover both. Various other modifications will undoubtedly suggest themselves to those skilled in the art.

I claim:
1. A plastic injection bushing comprising:
  a. an elongated member provided with a bore through which molten material is adapted to flow;
  b. an interior wall surface of said member being in direct heat conduction relation to the wall of a heat pipe adjacent to said member;
  c. said heat pipe comprising a hermetically sealed, evacuated chamber partially filled with a vaporizable liquid; and
  d. heating means for supplying heat to a localized section of said chamber for heating said liquid to a predetermined value.

2. A bushing as in claim 1 in which one end of said bore is adapted to be connected to a source of molten molding material and the other end which is provided with an exhaust port through which said molding material is adapted to be discharged into the interior of a mold.

3. A bushing as in claim 1 in which said heat pipe comprises a chamber surrounding said member along a major portion of its length.

4. A bushing as in claim 3 in which the bore of said member is clear of any internal obstructions throughout its length.

5. A plastic injection bushing comprising:
   a. an elongated member provided with a bore through which molten material is adapted to flow;
   b. an interior wall surface of said member being in direct heat conduction relation to the wall of a heat pipe adjacent to said member;
   c. said heat pipe comprising a hermetically sealed, evacuated chamber partially filled with a vaporizable liquid and surrounding said member along a major portion of its length;
   d. heating means for supplying heat to a localized section of said chamber for heating said liquid to a predetermined value;
   e. said heat pipe being provided along said localized section with capillary wicking extending along its internal surfaces whereby said liquid wets said wicking and progresses by capillary action throughout said localized section.

6. A bushing as in claim 5 in which said wicking comprises capillary grooves formed in an interior wall of said heat pipe and extending substantially entirely around said interior wall.

7. A bushing as in claim 3 in which said heating means are mounted externally to said heat pipe chamber along said localized section.

8. A bushing as in claim 3 in which,
   a. the discharge end of said bore communicates with an output nozzle port in an exhaust nozzle at one end of said tubular member, said tubular member being provided with a sleeve surrounding and spaced from said exhaust nozzle, said sleeve comprising heat shielding means around said nozzle, and
   b. a gate plug closing the outer end of said heat shielding sleeve except for a small discharge port.

9. A bushing as in claim 5 in which;
   a. said heating means comprises an electrical heater current control means are provided for supplying heating current to said heater, and
   c. temperature responsive means, responsive to the temperature of said heat pipe are supplied for controlling said current control means to maintain the temperature of said heat pipe at a predetermined level.

* * * * *